US012589647B2

(12) United States Patent
Liao

(10) Patent No.: US 12,589,647 B2
(45) Date of Patent: Mar. 31, 2026

(54) CHARGING INLET PROTECTION STRUCTURE OF ELECTRIC MOTORCYCLE

(71) Applicant: KWANG YANG MOTOR CO., LTD., Kaohsiung City (TW)

(72) Inventor: Teng-Fa Liao, Kaohsiung City (TW)

(73) Assignee: KWANG YANG MOTOR CO., LTD., Kaohsiung City (TW)

( * ) Notice: Subject to any disclaimer, the term of this patent is extended or adjusted under 35 U.S.C. 154(b) by 396 days.

(21) Appl. No.: 18/482,029

(22) Filed: Oct. 6, 2023

(65) Prior Publication Data

US 2024/0149665 A1     May 9, 2024

(30) Foreign Application Priority Data

Nov. 3, 2022     (TW) .................................. 111142025

(51) Int. Cl.
B60K 15/05 (2006.01)
B60L 53/16 (2019.01)

(52) U.S. Cl.
CPC .............. B60K 15/05 (2013.01); B60L 53/16 (2019.02); *B60L 2200/12* (2013.01)

(58) Field of Classification Search
CPC ...... B60K 15/05; B60L 53/16; B60L 2200/12
See application file for complete search history.

(56) References Cited

U.S. PATENT DOCUMENTS

| | | | |
|---|---|---|---|
| 9,090,301 B2 | 7/2015 | Matsuda | |
| 2003/0117103 A1* | 6/2003 | Lin .......................... | B62K 9/02 |
| | | | 320/104 |

* cited by examiner

*Primary Examiner* — Faye M Fleming
(74) *Attorney, Agent, or Firm* — Leong C. Lei

(57)                ABSTRACT
A charging inlet protection structure of an electric motorcycle is provided. The electric motorcycle includes a vehicle frame unit. A power unit and a seat cushion are arranged on the vehicle frame unit. A steering mechanism is arranged at a front end of the vehicle frame unit. An energy storage unit is arranged between the steering mechanism and the seat cushion. The electric motorcycle includes a vehicle body cover unit. The vehicle body cover unit includes an upper vehicle body cover portion and lateral vehicle body cover portions. A charging inlet is arranged on one side of the electric motorcycle to provide the energy storage unit with a supply from an external power source and includes an inlet base having a mounting cavity having a through hole. A charging socket is arranged in the through hole. The mounting cavity includes external cover pivoting seats pivotally connected by linking bars to an external cover.

10 Claims, 8 Drawing Sheets

CHARGING INLET PROTECTION STRUCTURE OF ELECTRIC MOTORCYCLE

BACKGROUND OF THE INVENTION

(a) Technical Field of the Invention

The present invention relates to a charging inlet protection structure of an electric motorcycle, and more particularly to a charging inlet protection structure of an electric motorcycle that enhances stiffness strength of an external cover of a charging inlet for opening and closing operations and ensures a concealing effect of a charging socket in the charging inlet.

(b) Description of the Prior Art

In the technical field of electric motorcycle charging inlets, the present applicant filed a Taiwan Utility Model TWM607087, "straddling electric motorcycle". The applicant intends to provide a better effect of protection for a protection cover of a charging inlet of an electric motorcycle.

Thus, it is a challenge for the electric motorcycle manufacturers to provide a charging inlet protection structure of an electric motorcycle, which improves the effect of protection for protecting a charging inlet of an electric motorcycle that is for supply of an external power source against invasion and damage by external rain water.

SUMMARY OF THE INVENTION

The primary objective of the present invention is to provide a charging inlet protection structure of an electric motorcycle, which is mainly to enhance stiffness strength of an external cover of a charging inlet for opening and closing operations and ensures a concealing effect of a charging socket in the charging inlet.

For such an objective, in some technical solutions of the present invention, a charging inlet protection structure of an electric motorcycle is provided, wherein the electric motorcycle comprises a vehicle frame unit, a power unit and a seat cushion being arranged on the vehicle frame unit, a steering mechanism being arranged at a front end of the vehicle frame unit, an energy storage unit being arranged between the steering mechanism and the seat cushion; the electric motorcycle further comprises a vehicle body cover unit, the vehicle body cover unit at least comprising an upper vehicle body cover portion and lateral vehicle body cover portions; a charging inlet is arranged on a side of a vehicle body of the electric motorcycle for providing the energy storage unit with a supply from an external power source, the charging inlet at least comprising an inlet base and an external cover, the inlet base being formed with a mounting cavity, the mounting cavity being formed with a through hole, a charging socket being arranged in the through hole; the mounting cavity is provided with a plurality of external cover pivoting seats, the plurality of external cover pivoting seats being each pivotally connected to a linking bar, the plurality of linking bars being pivotally connected to the external cover, the external cover being arranged to close and cover the mounting cavity.

The efficacy that the present invention may achieve by adopting some technical solutions is that stiffness strength of an external cover of a charging inlet for opening and closing operations is enhanced and a concealing effect of a charging socket in the charging inlet is ensured.

DETAILED DESCRIPTION OF THE PREFERRED EMBODIMENTS

For better understanding of the structure of the present invention, and the efficacy achieved thereby, a description will be provided below with reference to the drawings.

Figure 1:
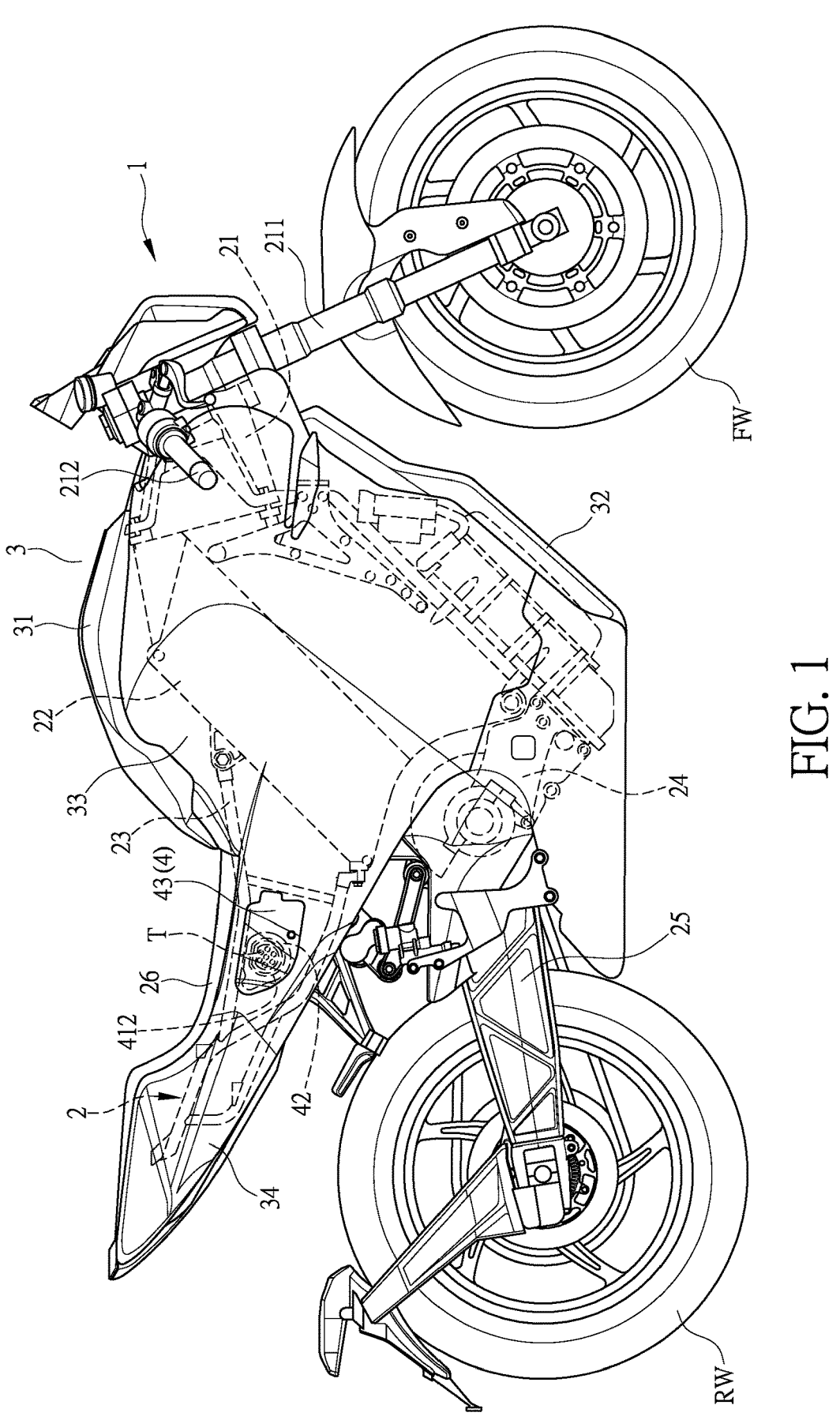
FIG. 1 is a side elevational view of an electric motorcycle according to the present invention.
Figure 2:
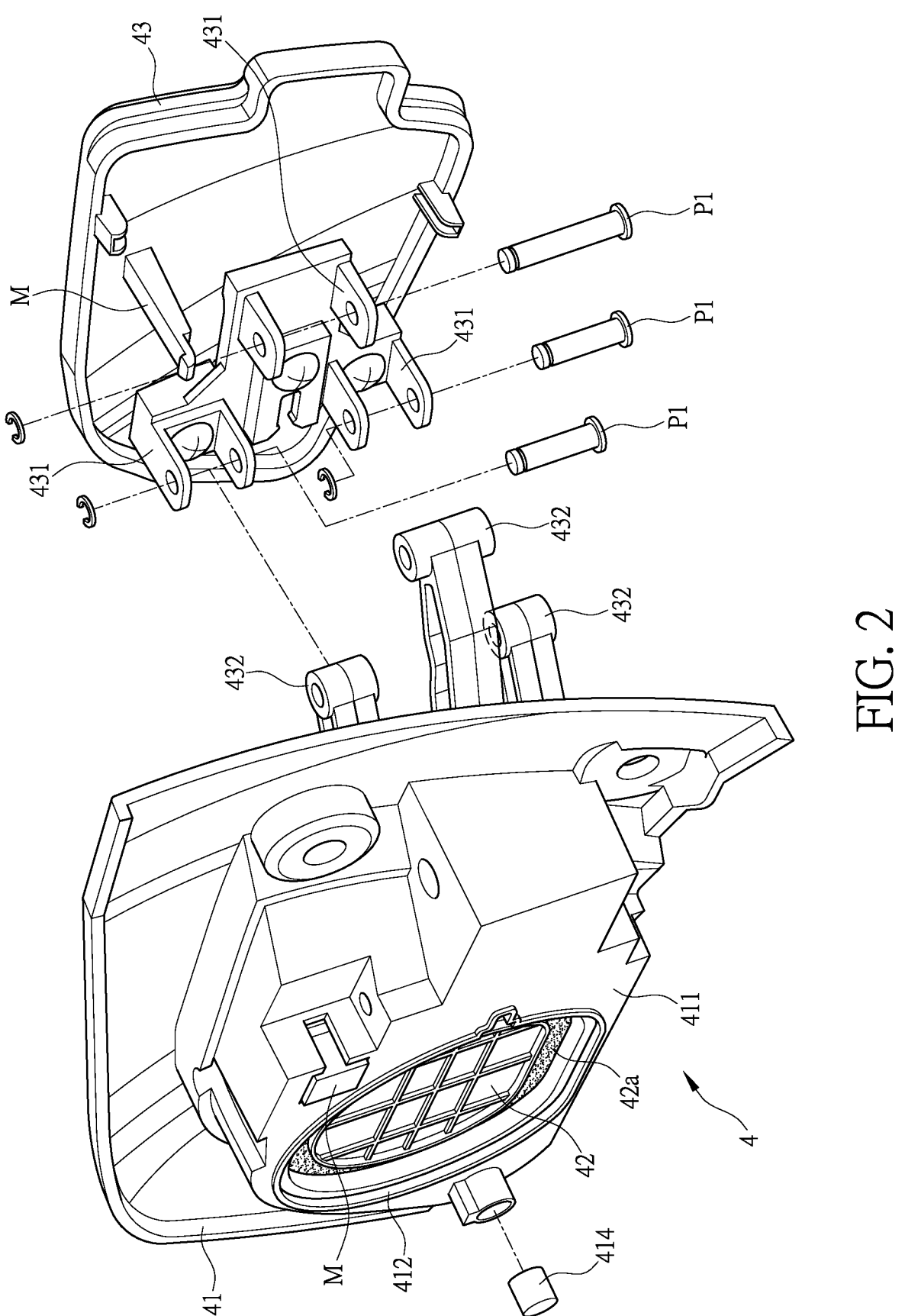
FIG. 2 is an exploded view of a charging inlet of the electric motorcycle according to the present invention.
Figure 3:
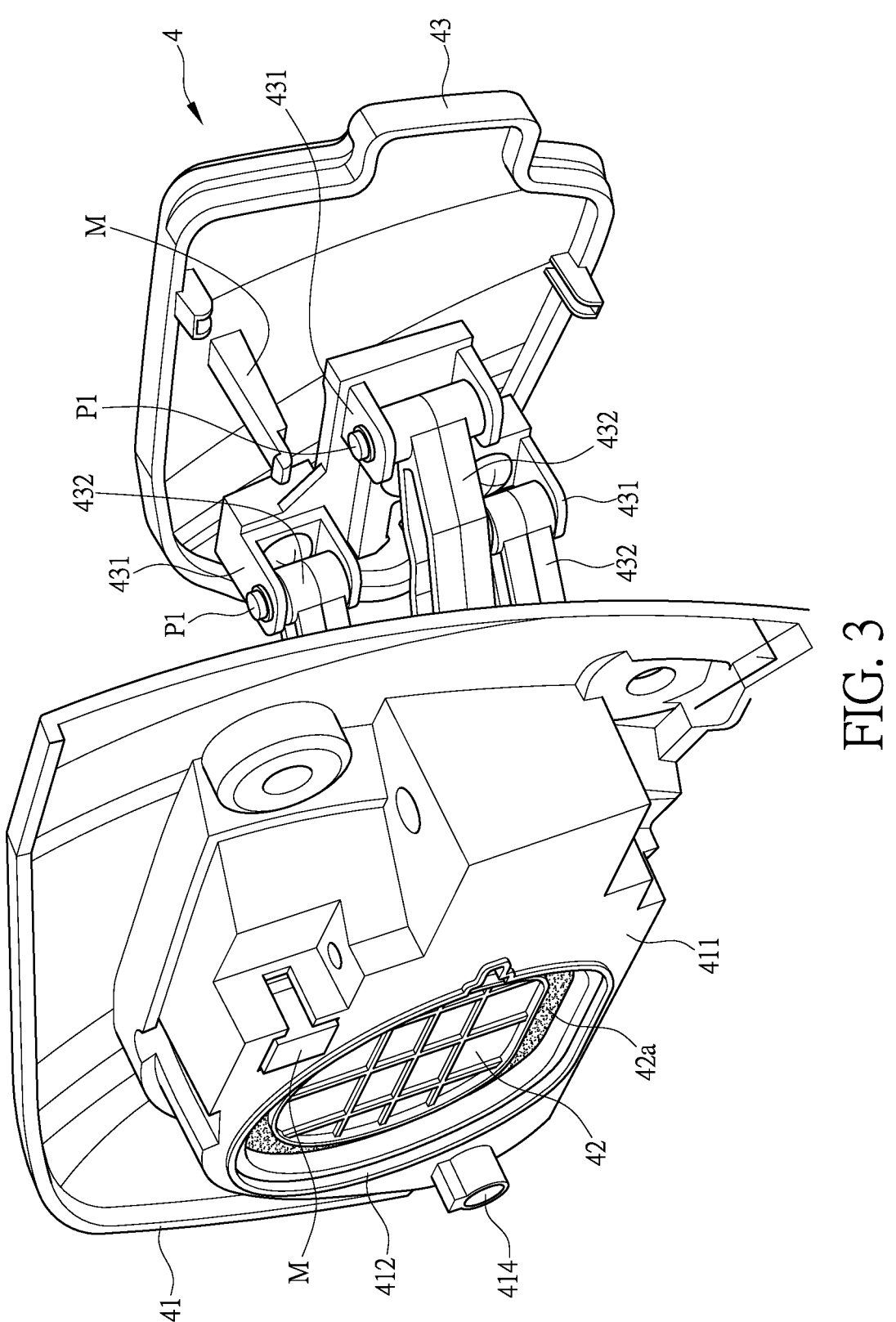
FIG. 3 is an assembled view of the charging inlet of the electric motorcycle according to the present invention.
Figure 4:
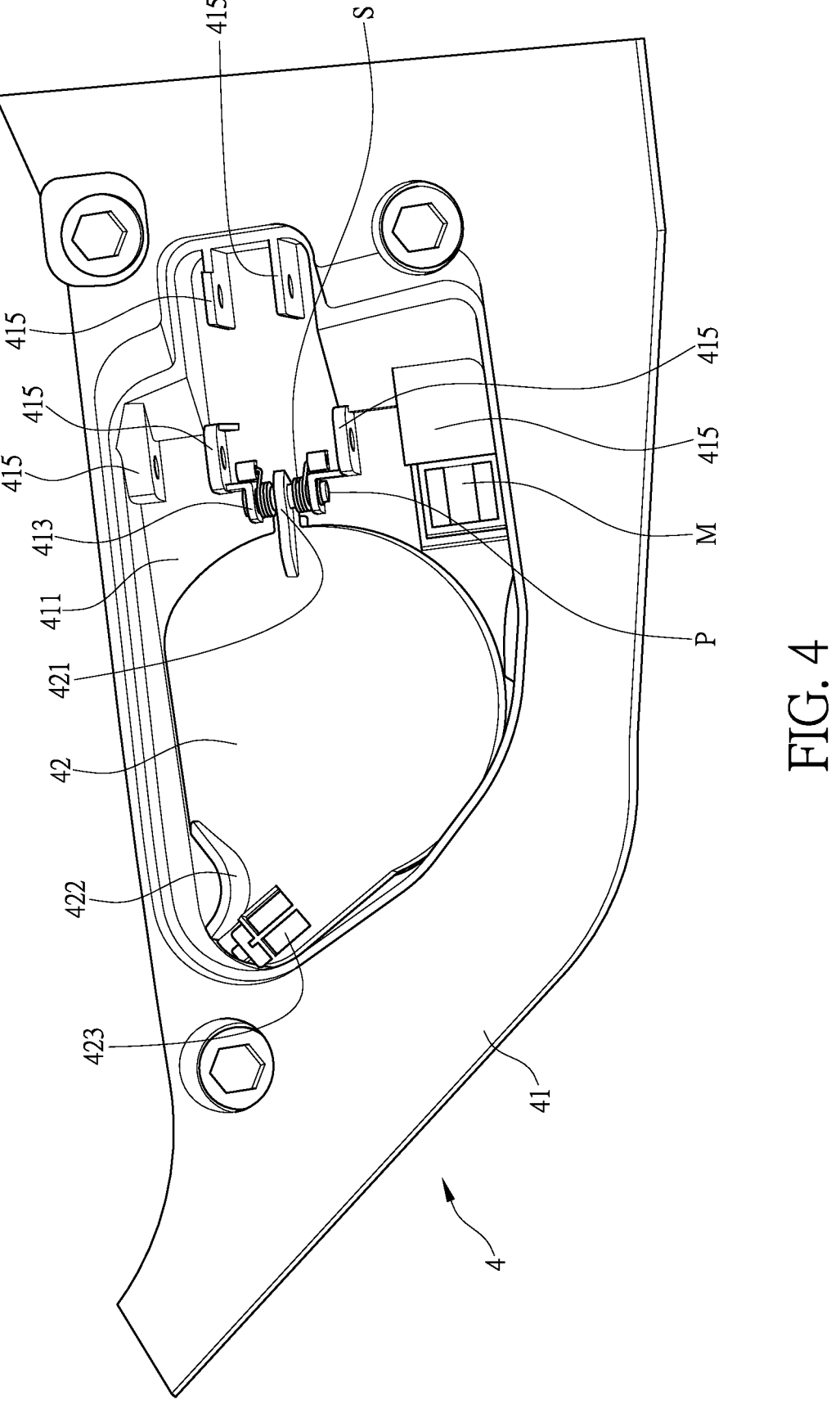
FIG. 4 is a schematic view of the charging inlet of the electric motorcycle according to the present invention, with an external cover removed.
Figure 5:
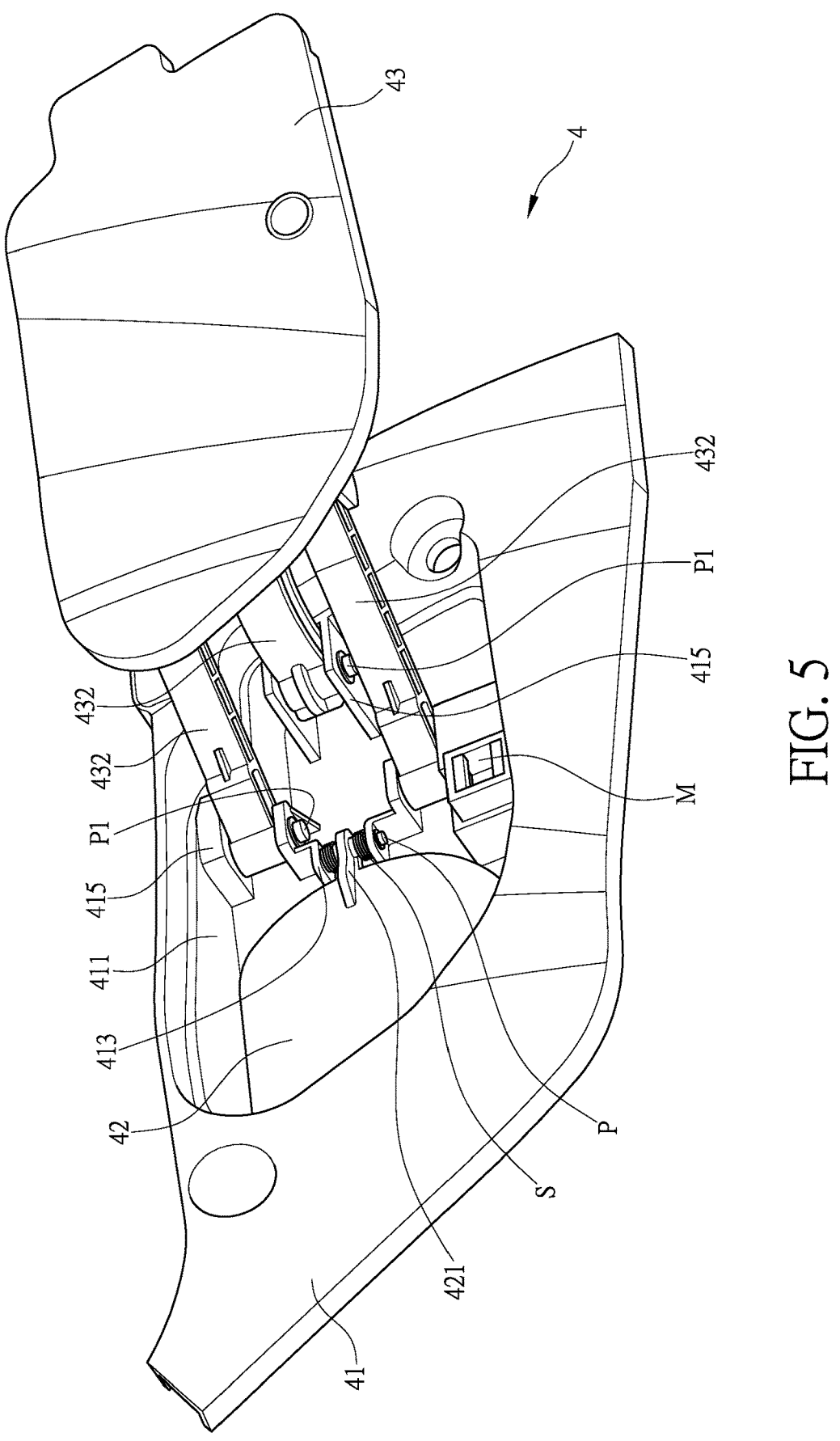
FIG. 5 is a schematic view of the charging inlet of the electric motorcycle according to the present invention, with the external cover being opened.
Figure 6:
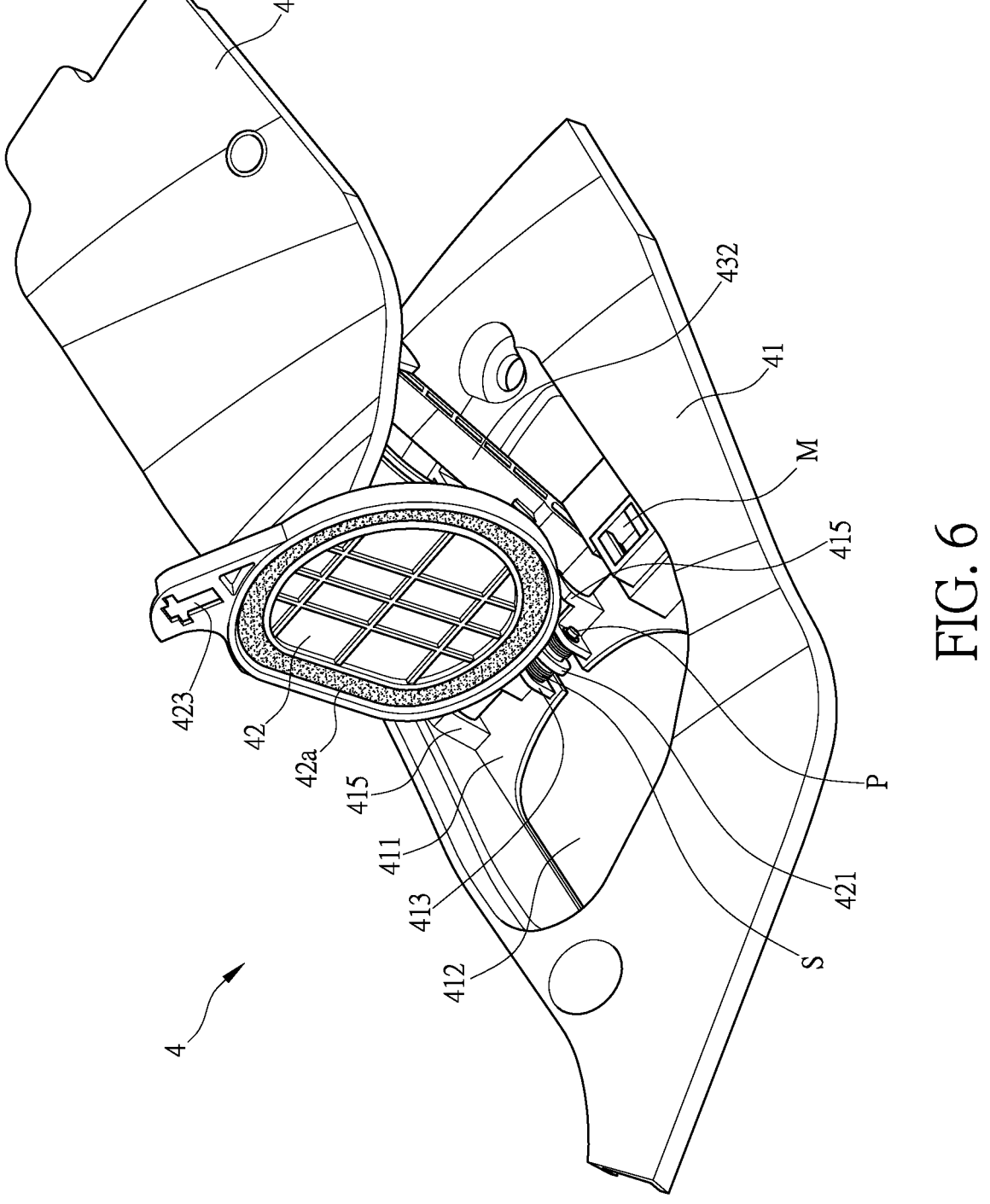
FIG. 6 is a schematic view of the charging inlet of the present invention the electric motorcycle, with an internal lid being opened.
Figure 7:
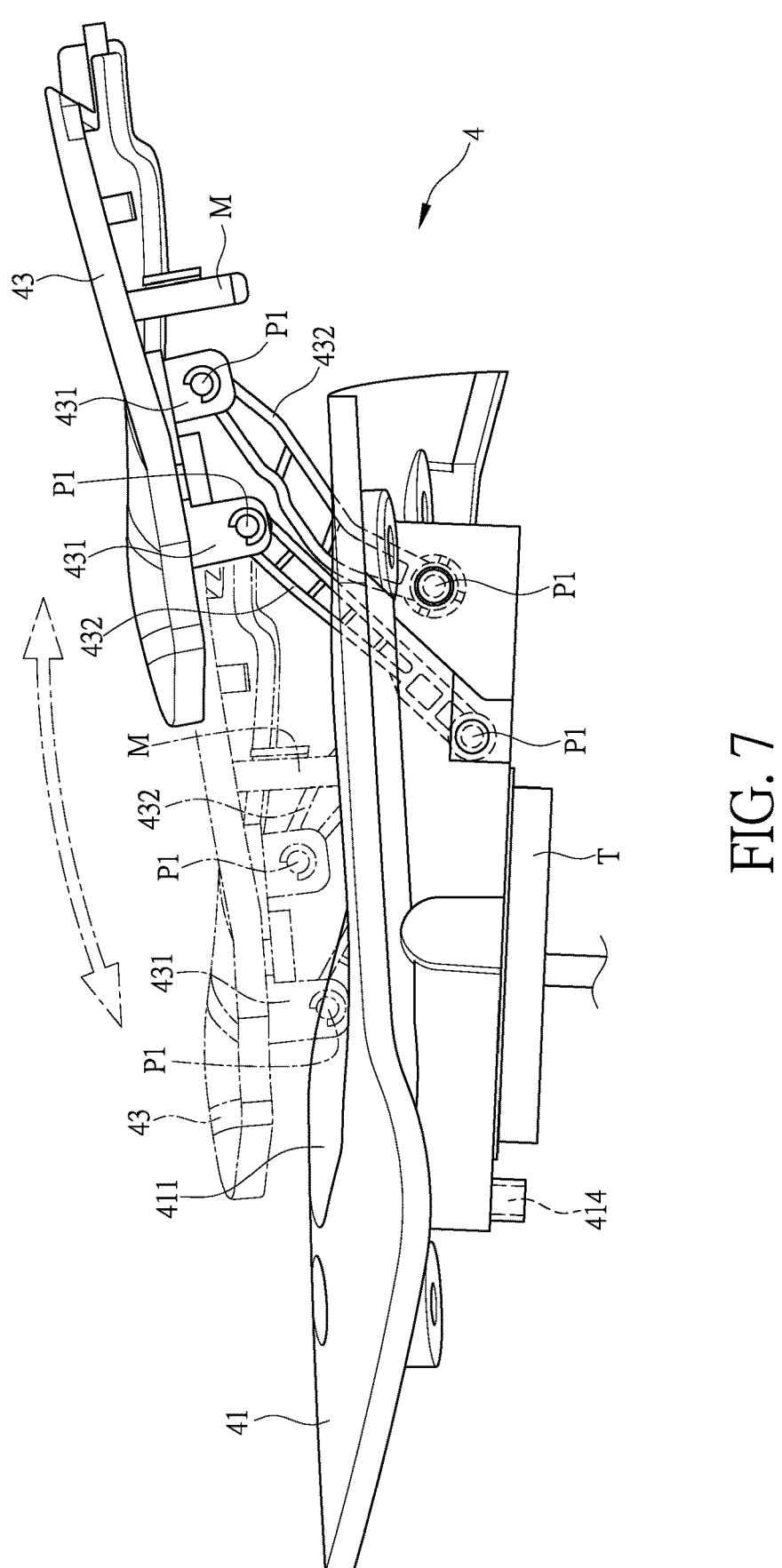
FIG. 7 is a schematic view showing an operation of opening the external cover of the charging inlet of the electric motorcycle according to the present invention.

Firstly, referring to FIG. 1, an electric motorcycle 1 at least comprises a vehicle frame unit 2. The vehicle frame unit 2 at least comprises a head tube portion 21 arranged toward a vehicle body front side. A front fork unit 211 is arranged at a lower side of a front end of the head tube portion 21. A front wheel FW is rotatably mounted to a lower side of the front fork unit 211. A steering mechanism 212 is arranged at an upper side of the head tube portion 21. An energy storage unit 22 that supplies electrical power is arranged at a vehicle body rear side of the head tube portion 21. A rear vehicle frame portion 23 is arranged at a vehicle body rear side of the energy storage unit 22. An electric power unit 24 is arranged at a lower side of the energy storage unit 22. A rear swingarm 25 is arranged at a vehicle body rear side of the power unit 24. A rear wheel RW is rotatably mounted to an end of the rear swingarm 25. A seat cushion 26 that receives a rider to sit thereon is arranged at an upper side of the rear vehicle frame portion 23. The electric motorcycle 1 is provided with a charging socket T that is connectable to an external power source for performing to the energy storage unit 22. The charging socket T is arranged on the lateral vehicle body of the electric motorcycle 1 and is located at a lower side of the seat cushion 26.

As shown in FIG. 1, the electric motorcycle 1 is provided with a vehicle body cover unit 3 that is set on and covers an external periphery of the vehicle frame unit 2. The vehicle body cover unit 3 comprises an upper vehicle body cover portion 31 set on and covering an upper side of the energy storage unit 22, a lower vehicle body cover portion 32 set on and covering a rear side and a lower side of the head tube portion 21, lateral vehicle body cover portions 33 set on and covering left and right lateral vehicle bodies of the vehicle body of the seat cushion 26 and the energy storage unit 22, rear vehicle body cover portions 34 set on and covering left and right lateral vehicle bodies of the vehicle body at a rear side of the seat cushion 26. A charging inlet 4 is arranged on lateral vehicle body cover portions 33 at a lower side of the seat cushion 26.

As shown in FIGS. 2, 3, 4, 5, 6, and 7, the charging inlet 4 comprises an inlet base 41. The inlet base 41 comprises a mounting cavity 411 that is arranged as a recess. A bottom of the mounting cavity 411 is formed with a through hole 412 penetrating therethrough. The charging socket T is arranged in the through hole 412. The charging socket T is electrically connected with the energy storage unit 22. The inlet base 41 is provided, in the mounting cavity 411, with an internal lid 42 that is pivotally mounted to cover and close the through hole 412. The internal lid 42 is provided with a sealing pad 42*a*. An external cover 43 is pivotally mounted in the mounting cavity 411 to close and cover the mounting cavity 411.

As shown in FIGS. 3, 4, 5, and 6, the mounting cavity 411 of the inlet base 41 is provided with an internal lid pivoting seat 413 adjacent to the through hole 412. One end of the internal lid 42 is provided with a pivoting portion 421, and a pivot axle P penetrates through the internal lid pivoting seat 413 and the pivoting portion 421 to have the end of the internal lid 42 pivotally mounted to the internal lid pivoting seat 413, so that the internal lid 42 is freely rotatable about a rotation center defined by the pivot axle P to thereby close or open the through hole 412. Further, an elastic element S is fit to the pivoting portion 421, and the present invention provides the elastic element S mounted on two sides of the pivoting portion 421 of the internal lid 42. Two ends of the elastic element S are respectively supported on or hooked on the pivoting portion 421 of the internal lid 42 or the mounting cavity 411, and as such, the elastic element S provides a pre-spring force on the pivoting portion 421. Another side of the internal lid 42 that is opposite to the pivoting portion 421 is provided, in a side edge, with a lifting portion 422. The lifting portion 422 is implemented in the present invention in the form of a raised curved rib. The internal lid 42 is further provided, at the side edge where the lifting portion 422 is provided, with a locking portion 423, and the locking portion 423 is implemented as a magnetically attracting member, and thus, the inlet base 41 is provided with a locking member 414 corresponding to the locking portion 423, and the locking member 414 is implemented as a magnetically attracted member. By means of magnetic attraction between the locking portion 423 and the locking member 414, a secure closure effect can be obtained for the internal lid 42 closing and covering the through hole 412. More specifically, the magnetic attraction force between the locking portion 423 and the locking member 414 is slightly greater than or equal to a spring-off force of the elastic element S, so that a user, when attempting to open the internal lid 42, only needs to use a finger to slightly lift the lifting portion 422, and the lifting force applied by the finger of the user is greater than the magnetic attraction force between the locking portion 423 and the locking member 414, and thus, the internal lid 42 can be easily lifted open, and the elastic element S may hold the internal lid 42 at a position of a predetermined degree of opening, by which the charging socket T is exposed for connection with the external power source to enable performance of a charging operation to the energy storage unit 22.

As shown in FIGS. 2, 3, 4, 5, and 7, the mounting cavity 411 of the inlet base 41 is provided with a plurality of external cover pivoting seats 415 adjacent to the internal lid pivoting seat 413. The plurality of external cover pivoting seats 415 are implemented as three such pivoting seats in the present invention, and the external cover pivoting seats 415 are arranged in a triangular configuration, meaning one at each of two sides of the internal lid pivoting seat 413 (up-down direction in the drawings) and one at right side (right side of left-right direction in the drawings). The external cover 43 is provided with a plurality of pivoting portions 431 corresponding to the plurality of external cover pivoting seats 415 of the inlet base 41. The plurality of pivoting portions 431 are also arranged in a triangular configuration as being corresponding to the plurality of external cover pivoting seats 415. Linking bars 432 are connected between the plurality of pivoting portions 431 and the plurality of external cover pivoting seats 415, meaning three such linking bars 432 are provided. Further, two of the three linking bars 432 are straight bars, while the remaining one is a curved bar. Each of the linking bars 432 has two ends respectively and rotatably connected to the pivoting portions 431 and the external cover pivoting seats 415, and specifically, the linking bars 432 are pivotally connected to the pivoting portions 431 and the external cover pivoting seats 415 by means of penetrating arrangement of pivot axles P1, so that the plurality of linking bars 432 take the pivot axles P1 at upper and lower ends as oscillation centers to drive the external cover 43 to lift from the mounting cavity 411 or to close and cover the mounting cavity 411. The linking bars 432 limit an opening degree of the external cover 43, namely after the external cover 43 is lifted open from the mounting cavity 411, the opening degree of the external cover 43 toward a vehicle body width direction does not exceed a width of the steering mechanism 212 in the vehicle body width direction. It is particularly noted that the plurality of linking bars 432 may form mutual constraining effect with respect to the mounting cavity 411 so that the external cover 43 can be secured and not shaking during an opening operation and the external cover 43 may have a final positioning effect after being opened. After the external cover 43 is lifted open from the mounting cavity 411, the internal lid 42 is exposed. A fastening mechanism M is arranged at one side of the external cover 43, so that the external cover 43 may securely close and cover the mounting cavity 411 by means of a fastening effect of the fastening mechanism M to thereby set the mounting cavity 411 in a closed condition to prevent external dust and moisture from entering the mounting cavity 411, and correspondingly, the user may operate and control the fastening mechanism M to release the fastened state to thereby allow the external cover 43 to be driven by the linking bars 432 to move a distance toward an outer side of the mounting cavity 411, and at this moment, the user may then push the external cover 43 toward one side and the external cover 43 takes the linking bars 432 as an oscillation center to translate toward one side of the vehicle body and no longer close and cover the mounting cavity 411, and as such, the external cover 43, after being opened, is transversely moved toward a lateral side of the vehicle body and then translate toward one side in the vehicle body front-rear direction to thereby expose the internal lid 42. A portion of the fastening mechanism M is arranged on the external cover 43, and another portion of the mechanism is arranged in the mounting cavity 411. The fastening mechanism M is implemented as a press-down snap mechanism or a solenoid mechanism, or a wire-controlled fastening mechanism in the present invention. When the external cover 43 closes and covers the mounting cavity 411, the external cover 43 forms a portion of the lateral vehicle body cover portions 33.

Figure 8:
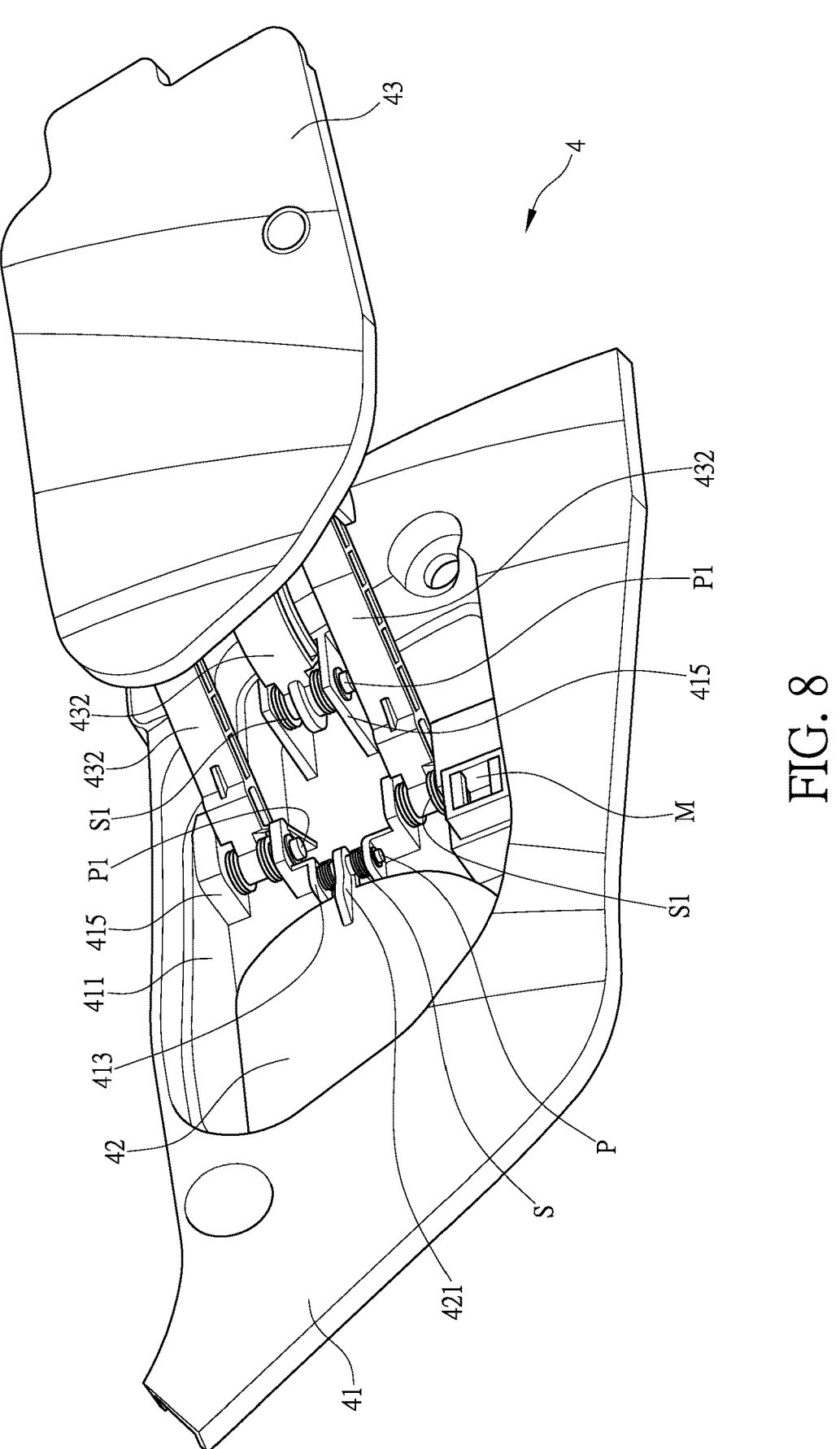
FIG. 8 is another embodiment of the charging inlet of the electric motorcycle according to the present invention.

As shown in FIG. 8, an elastic element Si is fit to the pivot axles P1 pivoting the linking bars 432 and the external cover pivoting seats 415. In the present invention, the elastic element Si is mounted on the pivot axles P1 at the side of the external cover pivoting seats 415, and two ends of the elastic element Si are respectively supported on or hooked on the mounting cavity 411 or the linking bars 432, so that the elastic element Si provides a pre-spring force on the linking bars 432 to facilitates opening of the external cover 43.

The present invention is mainly such that an electric motorcycle 1 comprises a vehicle frame unit 2, a power unit 24 and seat cushion 26 being arranged on the vehicle frame unit 2, a steering mechanism 212 being arranged at a front end of the vehicle frame unit 2, an energy storage unit 22 being arranged between the steering mechanism 212 and the seat cushion 26; the electric motorcycle 1 further comprises a vehicle body cover unit 3, the vehicle body cover unit 3 at least comprising an upper vehicle body cover portion 31 and lateral vehicle body cover portions 33; a charging inlet 4 is arranged on a side of a vehicle body of the electric motorcycle 1 for providing the energy storage unit 22 with a supply from an external power source, the charging inlet 4 comprising an inlet base 41, an internal lid 42, and an external cover 43, the inlet base 41 being formed with a mounting cavity 411, the mounting cavity 411 being formed with a through hole 412, a charging socket T being arranged in the through hole 412, the internal lid 42 being arranged to cover the through hole 412; the mounting cavity 411 is provided with a plurality of external cover pivoting seats 415, the plurality of external cover pivoting seats 415 being each pivotally connected with a linking bar 432, the plurality of linking bars 432 being pivotally connected to the external cover 43, the external cover 43 being arranged to close and cover the mounting cavity 41; and as such, stiffness strength of the external cover 43 of the charging inlet 4 for opening and closing operations is enhanced and a concealing effect of the charging socket T in the charging inlet 4 can be ensured.

In summary, by means of the above structure, the present invention may alleviate the drawbacks of the prior art and achieves the desired objective, and shows, as compared with the prior art, improvement in respect of performance, and obviously meets the requirements for novelty, utilization, and inventiveness. As such, an application is filed for granting of a patent.

I claim:

1. A charging inlet protection structure of an electric motorcycle, wherein the electric motorcycle comprises a vehicle frame unit, a power unit and a seat cushion being arranged on the vehicle frame unit, a steering mechanism being arranged at a front end of the vehicle frame unit, an energy storage unit being arranged between the steering mechanism and the seat cushion; the electric motorcycle further comprises a vehicle body cover unit, the vehicle body cover unit at least comprising an upper vehicle body cover portion and lateral vehicle body cover portions; a charging inlet is arranged on a side of a vehicle body of the electric motorcycle for providing the energy storage unit with a supply of an external power source, the charging inlet at least comprising an inlet base and an external cover, the inlet base being formed with a mounting cavity, the mounting cavity being formed with a through hole, a charging socket being arranged in the through hole; the mounting cavity is provided with a plurality of external cover pivoting seats, the plurality of external cover pivoting seats being each pivotally connected to a linking bar, the plurality of linking bars being pivotally connected to the external cover, the external cover being arranged to close and cover the mounting cavity; the external cover pivoting seats of the mounting cavity comprise three external cover pivoting seats, each of the external cover pivoting seats being pivotally connected to one linking bar; the external cover is provided with three pivoting portions for pivotally connecting the three linking bars; the three external cover pivoting seats are arranged in a triangular configuration; the plurality of linking bars form a mutual constraining effect with respect to the mounting cavity.

2. The charging inlet protection structure of the electric motorcycle according to claim 1, wherein the charging inlet further comprises an internal lid, the internal lid being arranged to cover the through hole; and an internal lid pivoting seat is arranged in the mounting cavity.

3. The charging inlet protection structure of the electric motorcycle according to claim 2, wherein a pivoting portion is arranged at one end of the internal lid, the internal lid being pivotally connected through the pivoting portion by a pivot axle to the internal lid pivoting seat.

4. The charging inlet protection structure of the electric motorcycle according to claim 3, wherein an elastic element is fit to the pivot axle, two ends of the elastic element being respectively supported on or hooked on the pivoting portion or the mounting cavity.

5. The charging inlet protection structure of the electric motorcycle according to claim 1, wherein the internal lid comprises a lifting portion and a locking portion, the mounting cavity being provided with a locking member corresponding to the locking portion; the locking portion comprises a magnetically attracting member, and the locking member comprises a magnetically attracted member.

6. The charging inlet protection structure of the electric motorcycle according to claim 1, wherein the external cover comprises a fastening mechanism; and a portion of the fastening mechanism is arranged on the external cover, and a portion on the mounting cavity.

7. The charging inlet protection structure of the electric motorcycle according to claim 6, wherein the fastening mechanism comprises a press-down snap mechanism or a wire-controlled fastening mechanism or a solenoid mechanism.

8. The charging inlet protection structure of the electric motorcycle according to claim 1, wherein the external cover pivoting seats are pivotally connected with the linking bars by means of pivot axles; elastic elements are fit to the pivot axles.

9. The charging inlet protection structure of the electric motorcycle according to claim 1, wherein two linking bars of the three linking bars are straight bars, and a remaining one of the linking bars is a curved bar.

10. The charging inlet protection structure of the electric motorcycle according to claim 1, wherein the linking bars constrain an opening degree of the external cover; after being opened, the external cover is transversely moved toward a lateral side of the vehicle body and then translate toward one side in a vehicle body front-rear direction; after being opened, the external cover does not exceed a width of the steering mechanism in a vehicle body width direction.

* * * * *